(12) United States Patent
Yu et al.

(10) Patent No.: US 11,047,785 B2
(45) Date of Patent: Jun. 29, 2021

(54) SYSTEM FOR TESTING RHEOLOGICAL BEHAVIOR OF SLURRY

(71) Applicant: CHINA ENFI ENGINEERING CORPORATION, Beijing (CN)

(72) Inventors: Runcang Yu, Beijing (CN); Shengqing Xie, Beijing (CN); Shihu Shi, Beijing (CN); Weigen Zhu, Beijing (CN); Ruijun Zhu, Beijing (CN); Maokun He, Beijing (CN)

(73) Assignee: CHINA ENFI ENGINEERING CORPORATION, Beijing (CN)

( * ) Notice: Subject to any disclaimer, the term of this patent is extended or adjusted under 35 U.S.C. 154(b) by 113 days.

(21) Appl. No.: 16/617,711

(22) PCT Filed: Jul. 12, 2018

(86) PCT No.: PCT/CN2018/095472
§ 371 (c)(1),
(2) Date: Nov. 27, 2019

(87) PCT Pub. No.: WO2019/062280
PCT Pub. Date: Apr. 4, 2019

(65) Prior Publication Data
US 2020/0158613 A1    May 21, 2020

(30) Foreign Application Priority Data

Sep. 26, 2017   (CN) .......................... 201710884619.7
Sep. 26, 2017   (CN) .......................... 201721246384.0

(51) Int. Cl.
*G01N 11/08*        (2006.01)
(52) U.S. Cl.
CPC .................................... *G01N 11/08* (2013.01)

(58) Field of Classification Search
CPC ........ G01N 11/00; G01N 11/08; G01N 11/14; G01N 33/383; G01N 2011/0046
See application file for complete search history.

(56) References Cited

U.S. PATENT DOCUMENTS 3,766,773 A  *  10/1973  Limpert ................. G01N 11/04
                                              73/54.12
4,316,383 A  *   2/1982  Fruman .................. G01N 11/08
                                              73/54.09

(Continued)

FOREIGN PATENT DOCUMENTS

CN        107525741 A       12/2017
CN        207197980 U        4/2018

OTHER PUBLICATIONS

International Search Report for Application No. PCT/CN2018/095472 dated Oct. 18, 2018.

*Primary Examiner* — Natalie Huls
(74) *Attorney, Agent, or Firm* — Marshall, Gerstein & Borun LLP

(57) ABSTRACT

A system for testing a rheological behavior of a slurry comprises a first stirring reactor, a second stirring reactor, a material supply pipe, a driving device, and a pressure detection member. The driving device has a first state and a second state. In the first state, the driving device drives a slurry in the first stirring reactor to be outputted to the second stirring reactor. In the second state, the driving device drives the slurry in the second stirring reactor to be outputted to the first stirring reactor. The pressure detection member is used to measure a pressure level in the material supply pipe.

10 Claims, 1 Drawing Sheet

(56) References Cited

U.S. PATENT DOCUMENTS

| | | | | |
|---|---|---|---|---|
| 5,610,325 | A * | 3/1997 | Rajagopal | G01N 11/142 |
| | | | | 73/54.35 |
| 6,227,039 | B1 * | 5/2001 | Te'eni | C04B 40/0032 |
| | | | | 73/54.03 |
| 10,613,009 | B2 * | 4/2020 | Belitsch | G01N 11/04 |
| 2005/0132782 | A1 * | 6/2005 | Wallevik | B01F 7/063 |
| | | | | 73/54.28 |
| 2008/0060423 | A1 * | 3/2008 | Jau | G01N 11/14 |
| | | | | 73/54.31 |
| 2008/0163703 | A1 * | 7/2008 | Boncan | G01N 11/14 |
| | | | | 73/865.6 |
| 2010/0121583 | A1 * | 5/2010 | Abbott | G01N 11/14 |
| | | | | 702/50 |
| 2015/0355160 | A1 * | 12/2015 | Berman | G01N 11/14 |
| | | | | 73/54.03 |
| 2020/0080391 | A1 * | 3/2020 | Marlatt | B28C 7/024 |

\* cited by examiner

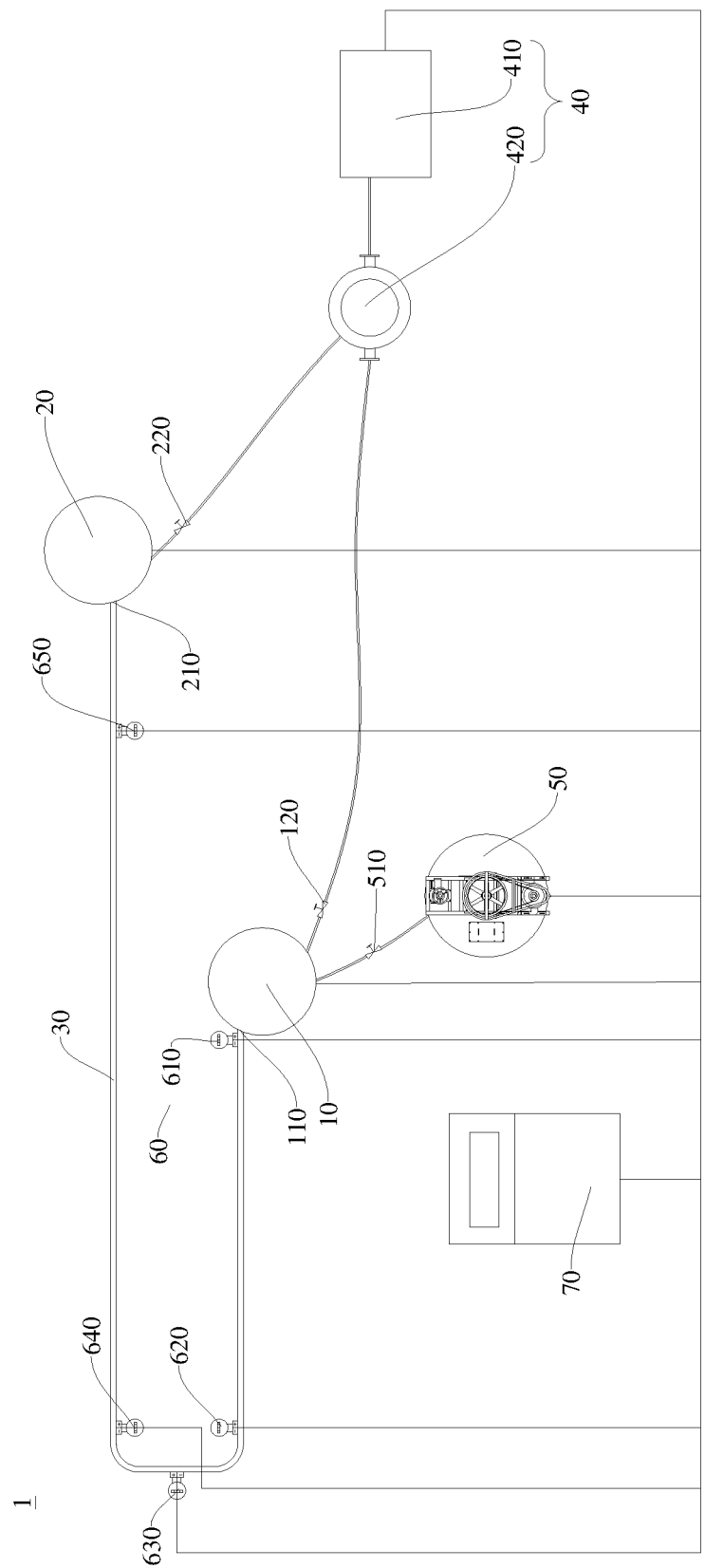

SYSTEM FOR TESTING RHEOLOGICAL BEHAVIOR OF SLURRY

CROSS-REFERENCE TO RELATED APPLICATION

This application is a national phase entry under 35 USC 371 of International Patent Application No. PCT/CN2018/095472 filed Jul. 12, 2018 which claims priority to and benefits of Chinese Patent Application Serial No. 201710884619.7 and Chinese Patent Application Serial No. 201721246384.0 filed with the National Intellectual Property Administration of P. R. China on Sep. 26, 2017, the entire content of which is incorporated herein by reference.

FIELD

The present disclosure relates to the field of rheological behavior measuring devices, and more particularly to a system for testing a rheological behavior of slurry.

BACKGROUND

Industrial tailing cemented slurry is prepared by mixing tailings, cementitious materials and water, and laboratory methods for measuring rheological behaviors of the tailing cemented slurry generally includes a capillary method, a falling-ball method, a rotation method, a plate method, a vibration method, etc. However, due to limited by accuracies of the test instruments and a variation range of transporting speeds, parameters measured by these methods do not completely reflect the rheological properties of the slurry.

In order to determine rheological parameters of the slurry during a transporting process in a pipeline, in Huize lead-zinc mine, Jinchuan nickel mine and Dongguashan copper mine, a large-scale industrial loop test system was designed according to underground pipeline laying situations. However, test results obtained from this test system show that data collected by this test system has a large dispersion, and irregular pressure changes even occur at some test points. This is because the traditional loop test system uses a piston pump to simulate high pressure environment, and the pump has a periodic stroke, so change and transmission of the pressure in the pipeline system is also periodic. However, flow fluctuation and pressure fluctuation do not have a strict time cycle, but data is collected strictly in accordance with a fixed time interval within a cycle. As a result, the regularity of the pressure change presented by the collected data does not conform to the theory of fluid mechanics, thereby not meeting test requirements. Moreover, this test system consumes a lot of manpower, material and financial resources, and the test cycle is relatively long, which affects the progress and planning of the test.

SUMMARY

Embodiments of the present disclosure seek to solve at least one of the problems existing in the related art to at least some extent. For this, embodiments of the present disclosure provide a system for testing a rheological behavior of slurry, which can achieve more accurate parameter measurement, a shorter test cycle and lower test costs.

The system for testing a rheological behavior of slurry according to embodiments of the present disclosure includes: a first stirring reactor, provided with a first opening; a second stirring reactor, provided with a second opening; a transporting pipeline, connecting the first opening and the second opening; a driving device, connected to each of the first stirring reactor and the second stirring reactor, configured to drive a first state that the slurry in the first stirring reactor is output to the second stirring reactor, and drive a second state that the slurry in the second stirring reactor is output to the first stirring reactor, and at least configured to be capable of switching between the first state and the second state; and a pressure detecting member, configured to measure pressure in the transporting pipeline.

In some embodiments, the driving device includes: an air compressor, connected to each of the first stirring reactor and the second stirring reactor, and configured to drive flow of the slurry by adjusting air pressure.

Specifically, the driving device further includes: a gash-older arranged between the first stirring reactor and the air compressor and between the second stirring reactor and the air compressor.

Specifically, a first regulating valve is provided between the air compressor and the first stirring reactor for adjusting air flow; and a second regulating valve is provided between the air compressor and the second stirring reactor for adjusting air flow.

In some embodiments, the system includes a plurality of the pressure detecting members spaced apart along a length direction of the transporting pipeline.

In some embodiments, the system further includes: a controlling device, electrically connected to each of the first stirring reactor and the second stirring reactor to adjust a stirring speed of the first stirring reactor and that of the second stirring reactor, respectively; electrically connected to the driving device to adjust a running state of the driving device; and electrically connected to the pressure detecting member to record data collected by the pressure detecting member.

In some embodiments, the controlling device may also be configured to control opening and closing of lids of the first stirring reactor and the second stirring reactor, pressurization and decompression of the first stirring reactor and the second stirring reactor, and start-up/shutdown of an atmospheric stirring tank.

In some embodiments, the controlling device may be further configured to, in real time, monitor liquid level changes in the first stirring reactor and the second stirring reactor, and monitor and output pressure changes in the transporting pipeline detected by the pressure detecting members.

In some embodiments, the system further includes: an atmospheric stirring tank, connected to the first stirring reactor to supply the slurry for the first stirring reactor.

Alternatively, the system further includes: a transporting valve disposed between the atmospheric stirring tank and the first stirring reactor.

In some embodiments, the transporting pipeline is arranged to meander between the first stirring reactor and the second stirring reactor to prolong connection between the first stirring reactor and the second stirring reactor.

In some embodiments, the transporting pipeline is provided with the pressure detecting members at positions near the first opening, the second opening, and a bend of the transporting pipeline.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 is a schematic diagram of a system for testing a rheological behavior of slurry according to some embodiments of the present disclosure.

REFERENCE NUMERALS system 1 for testing a rheological behavior of slurry,
first stirring reactor 10, first opening 110, first regulating valve 120,
second stirring reactor 20, second opening 210, second regulating valve 220, transporting pipeline 30,
driving device 40, air compressor 410, gasholder 420, atmospheric stirring tank 50, transporting valve 510,
pressure detecting member 60, first pressure detecting member 610, second pressure detecting member 620, third pressure detecting member 630, fourth pressure detecting member 640, fifth pressure detecting member 650, controlling device 70.

DETAILED DESCRIPTION

Embodiments of the present disclosure will be described in detail below, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are merely used to generally understand the present disclosure, and shall not be construed to limit the present disclosure.

In the following, a system 1 for testing a rheological behavior of slurry according to embodiments of the present disclosure will be described in detail referring to FIG. 1.

As shown in FIG. 1, the system 1 for testing the rheological behavior of slurry according to embodiments of the present disclosure includes a first stirring reactor 10, a second stirring reactor 20, a transporting pipeline 30, a driving device 40, and a pressure detecting member 60. The first stirring reactor 10 is provided with a first opening 110, the second stirring reactor 20 is provided with a second opening 210, and the transporting pipeline 30 connects the first opening 110 and the second opening 210. The driving device 40 is connected to each of the first stirring reactor 10 and the second stirring reactor 20, and configured to drive the slurry in the first stirring reactor 10 to be output to the second stirring reactor 20 in a first state, and drive the slurry in the second stirring reactor 20 to be output to the first stirring reactor 10 in a second state. The driving device 40 is at least configured to be capable of switching between the first state and the second state. The pressure detecting member 60 is configured to measure pressure in the transporting pipeline 30.

It is to be understood that, the first stirring reactor 10 and the second stirring reactor 20 are connected through the transporting pipeline 30. The driving device 40 is able to drive the slurry in the first stirring reactor 10 to be output to the second stirring reactor 20, and also able to drive the slurry in second stirring reactor 20 to be output to the first stirring reactor 10. Therefore, in the test process, the first stirring reactor 10 and the second stirring reactor 20 may be alternately used as a slurry supplying device to each other, so as to complete several round trips of the slurry between the first stirring reactor 10 and the second stirring reactor 20. In the transporting process of the slurry, the pressure detecting member 60 is capable of collecting pressure change in the transporting pipeline 30 in real time. Therefore, the system 1 for testing the rheological behavior of slurry according to embodiments of the present disclosure can reuse and avoid the waste of the slurry, shorten the test cycle and improve the efficiency of repeated tests, as well as reduce the test cost. In addition, as the test can be easily performed for several times by the system 1 according to embodiments of the present disclosure, a researcher can remove a system error and a personal error based on a large number of test data, thereby improving the test accuracy.

With the system 1 for testing the rheological behavior of slurry according to embodiments of the present disclosure, the first stirring reactor 10 and the second stirring reactor 20 may be used as the slurry supplying devices to each other under the action of the driving device, thereby realizing reuse of and avoiding waste of the slurry, shortening the test cycle, improving the test efficiency, and reducing the test cost. In addition, as the test can be easily performed for several times by the system 1 for testing the rheological behavior of slurry according to embodiments of the present disclosure, the researcher can remove the system error and the personal error based on a large number of test data, thereby improving the test accuracy.

In some embodiments, as shown in FIG. 1, the driving device 40 includes an air compressor 410. The air compressor 410 is connected to each of the first stirring reactor 10 and the second stirring reactor 20, as so to drive flow of the slurry by adjusting air pressure. It is to be understood that, when the first stirring reactor 10 is used as the slurry supplying device of the second stirring reactor 20, the air compressor 410 is communicated with the first stirring reactor 10 to input compressed air to the first stirring reactor 10. As a result, air pressure in the first stirring reactor 10 rises to be higher than that in the second stirring reactor 20, such that the slurry flows to the second stirring reactor 20 under a pressure difference. In addition, in the transporting process, due to the higher air pressure in the first stirring reactor 10 and the incompressibility of the slurry, the slurry at a bottom of the first stirring reactor 10 can enter the transporting pipeline 30 in an ideal flow state, such that the slurry can be uniformly output from the first stirring reactor 10 by using the air pressure as a driving force, test parameters measured thereby are relatively stable, and data obtained is more close to actual production.

Specifically, as shown in FIG. 1, the driving device 40 further includes a gasholder 420, and the gasholder 420 is arranged between the first stirring reactor 10 and the air compressor 410 and between the second stirring reactor 20 and the air compressor 410. It is to be understood that, air transported by the air compressor 410 in the work process thereof will cause pressure fluctuation, and an air transporting speed of the air compressor 410 is relatively slow, and thus a large amount of gas cannot be transported to the stirring reactor within a short time. For this, the gasholder 420 is arranged between the stirring reactor and the air compressor 410. In this way, the compressed air output by the air compressor 410 enters the stirring reactor after passing through the gasholder 420, which makes the airflow relatively stable and the pressure fluctuation small. Therefore, the slurry can be transported more evenly, and the accuracy of test parameters is improved.

It is to be understood that, the driving device 40 is not limited to a structure including the air compressor 410 and the gasholder 420, but may be in other forms. For example, the driving device 40 may be configured as a lifting device, which for example drives movement of the first stirring reactor 10 to generate a height difference with the second stirring reactor 20, and under the action of gravity, the slurry flows from the first stirring reactor 10 into the second stirring reactor 20 or from the second stirring reactor 20 into the first stirring reactor 10.

Specifically, a first regulating valve 120 is provided between the air compressor 410 and the first stirring reactor 10 for adjusting air flow, and a second regulating valve 220 is provided between the air compressor 410 and the second stirring reactor 20 for adjusting air flow. In this way, the air compressor 410 may choose to output air to the first stirring reactor 10 or the second stirring reactor 20. For example, when the slurry needs to be transported from the first stirring reactor 10 to the second stirring reactor 20, the first regulating valve 120 needs to be opened and the second regulating valve 220 needs to be closed, so as to achieve the transportation of the compressed air from the air compressor 410 to the first stirring reactor 10.

Alternatively, the first regulating valve 120 and the second regulating valve 220 are pneumatic regulating valves, which can achieve simple and quick control. Furthermore, as the pneumatic regulating valve has a high safety performance, it is unnecessary to install an explosion-proof device on the regulating valve.

Alternatively, the first regulating valve 120 and the second regulating valve 220 are solenoid valves. As different control schemes may be realized when the solenoid valve cooperates with different circuits, a plurality of gas transporting schemes may be achieved using the solenoid valve as the regulating valve, so that the system 1 for testing the rheological behavior of slurry may be used in a variety of material transporting environment.

Alternatively, the first regulating valve 120 and the second regulating valve 220 are manual regulating valves. Therefore, the cost of the system 1 for testing the rheological behavior of slurry can be reduced.

In some embodiments, the system 1 includes a plurality of the pressure detecting members 60 spaced apart along a length direction of the transporting pipeline 30. Therefore, multiple sets of data may be obtained in one test, and the test efficiency is improved.

In some embodiments, as shown in FIG. 1, the system 1 for testing the rheological behavior of slurry further includes a controlling device 70. The controlling device 70 is electrically connected to each of the first stirring reactor 10 and the second stirring reactor 20 to adjust a stirring speed of the first stirring reactor 10 and that of the second stirring reactor 20, respectively. The controlling device 70 is electrically connected to the driving device 40 to adjust a running state of the driving device 40. The controlling device 70 is electrically connected to the pressure detecting member 60 to record data collected by the pressure detecting member 60. Therefore, automatic control of the test process can be realized, the test parameters can be set by the researcher as required to achieve diversification of test conditions, the range of test data is expanded, and the test efficiency is improved.

Alternatively, the system 1 for testing the rheological behavior of slurry further includes a liquid level detecting member (not shown in FIG. 1) for detecting a liquid level of the slurry in each of the first stirring reactor 10 and the second stirring reactor 20. The liquid level detecting member is electrically connected to the controlling device 70. The controlling device 70 may be further configured to control running states of the driving device 40, the first stirring reactor 10 and the second stirring reactor 20 according to data measured by the liquid level detecting member.

In some alternative embodiments, the controlling device 70 may be configured as a PLC (programmable logic controller) controlling system. The PLC controlling system is capable of controlling start-up/shutdown of the driving device 40 and controlling the pressures in the stirring reactors. The PLC controlling system is also capable of collecting basic parameters including liquid level changes and pressure situations in the stirring reactors, and pressure changes in the pipeline. Furthermore, the PLC controlling system is provided with a USB interface for the researcher's convenience to export data for analysis.

In some embodiments, as shown in FIG. 1, the system 1 for testing the rheological behavior of slurry further includes an atmospheric stirring tank 50. The atmospheric stirring tank 50 is connected to the first stirring reactor 10 to supply the slurry for the first stirring reactor. As described hereinbefore, the first stirring reactor 10 and the second stirring reactor 20 may be alternately used as the slurry supplying device to each other in the test process, then it is to be understood that, the first stirring reactor 10 needs to be filled with the slurry before the start of the test. Using the atmospheric stirring tank 50 as a slurry supplying device of the first stirring reactor 10, the slurry, before transported to the first stirring reactor 10, may be stirred by the atmospheric stirring tank 50 to make it more close to an actual work condition. In some alternative embodiments, the atmospheric stirring tank 50 may also be connected to the second stirring reactor 20 to supply the slurry for the second stirring reactor 20. Further, the slurry supplying device is not limited to the atmospheric stirring tank 50, but may also be other devices like a feeding pump.

Alternatively, the system 1 for testing the rheological behavior of slurry further includes a transporting valve 510. The transporting valve 510 is disposed between the atmospheric stirring tank 50 and the first stirring reactor 10. As described hereinbefore, the first stirring reactor 10 and the second stirring reactor 20 may be used as the slurry supplying devices to each other in the test process, that is to say, after the test is started, the atmospheric stirring tank 50 does not need to supply slurry to the first stirring reactor 10 anymore. For this, by setting the transporting valve 510, the first stirring reactor 10 may be disconnected from the atmospheric stirring tank 50 by the transporting valve 510 after the test is started, thereby saving the slurry, avoiding waste of the slurry, and reducing the test cost.

In some embodiments, the transporting pipeline 30 is arranged to meander between the first stirring reactor 10 and the second stirring reactor 20 to prolong connection between the first stirring reactor 10 and the second stirring reactor 20, which provides space for installing the plurality of the pressure detecting members 60, and ensures a certain distance between two adjacent pressure detecting members 60, thereby making data measured more representative.

In some embodiments, the transporting pipeline 30 is provided with the pressure detecting members 60 at positions near the first opening 110, the second opening 210, and a bend of the transporting pipeline 30, so as to measure pressure data at an exit, the bend and ends of the pipeline, thereby making the range of the data broader and the accuracy of the data higher.

In some embodiments, the controlling device 70 may be further configured to control opening and closing of lids of the first stirring reactor 10 and the second stirring reactor 20, pressurization and decompression of the first stirring reactor 10 and the second stirring reactor 20, and start-up/shutdown of the atmospheric stirring tank 50.

In some alternative embodiments, the controlling device 70 may be further configured to, in real time, monitor liquid level changes in the first stirring reactor 10 and the second stirring reactor 20, and monitor and output pressure changes in the transporting pipeline 30 detected by the pressure detecting members 60.

Alternatively, the transporting pipeline 30 may include a plurality of subsections with different diameters, thereby further expanding the range of test data.

In the following, a system 1 for testing a rheological behavior of slurry according to a specific embodiment of the present disclosure will be described with reference to FIG. 1.

As shown in FIG. 1, the system 1 for testing the rheological behavior of slurry according to this embodiment includes a first stirring reactor 10, a second stirring reactor 20, a transporting pipeline 30, an atmospheric stirring tank 50, a driving device 40, a pressure detecting member 60 and a controlling device 70.

The first stirring reactor 10 is provided with a first opening 110, the second stirring reactor 20 is provided with a second opening 210, and the transporting pipeline 30 connects the first opening 110 and the second opening 210. The atmospheric stirring tank 50 is connected to the first stirring reactor 10 to supply the slurry for first stirring reactor 10, and a transporting valve 510 is disposed between the atmospheric stirring tank 50 and the first stirring reactor 10.

The driving device 40 includes an air compressor 410 and a gasholder 420. The air compressor 410 is connected to the gasholder 420. The gasholder 420 is connected to each of the first stirring reactor 10 and the second stirring reactor 20. A first regulating valve 120 is provided between the gasholder 420 and the first stirring reactor 10, and a second regulating valve 220 is provided between the gasholder 420 and the second stirring reactor 20.

The controlling device 70 is a PLC system, and is electrically connected to each of the first stirring reactor 10 and the second stirring reactor 20 to adjust a stirring speed of the first stirring reactor 10 and that of the second stirring reactor 20, respectively. The controlling device 70 is electrically connected to the driving device 40 to adjust a running state of the driving device 40. The controlling device 70 is electrically connected to the pressure detecting member 60 to record data collected by the pressure detecting member 60.

The transporting pipeline 30 is in a U-shape and arranged between the first stirring reactor 10 and the second stirring reactor 20. A first pressure detecting member 610 is arranged at a position of the transporting pipeline 30 near the first opening 110, and a fifth pressure detecting member 650 is arranged at a position of the transporting pipeline 30 near the second opening 210. A third pressure detecting member 630 is arranged at a bend of the transporting pipeline 30, and a second pressure detecting member 620 and a fourth pressure detecting member 640 are symmetrically arranged at positions of the transporting pipeline 30 entering and leaving the bend.

According to the test design and pressure values measured at measuring points, it is assumed that a value measured by the first pressure detecting member 610 is recorded as P1, a value measured by the second pressure detecting member 620 is recorded as P2, a value measured by the third pressure detecting member 620 is recorded as P3, a value measured by the fourth pressure detecting member 640 is recorded as P4, and a value measured by the fifth pressure detecting member 650 is recorded as P5.

Pipe friction drags in four flow directions were calculated:
(1) Friction drag in a horizontal straight pipe: $J1=\Delta P1/L1$
(2) Friction drag in a horizontal elbow: $J2=(\Delta P2-J1\times 0.7)/2$
(3) Friction drag in a horizontal elbow: $J3=(\Delta P3-J1\times 0.7)/2$
(4) Friction drag in a horizontal straight pipe: $J4=\Delta P4/L4$
where J1, J2, J3, J4 are the pipe friction drags, in MPa; $\Delta P1$, $\Delta P2$, $\Delta P3$ and $\Delta P4$ each are pressure differences between corresponding two adjacent pressure detecting members 60, in MPa. That is, $\Delta P1=P2-P1$, and $\Delta P2$, $\Delta P3$ and $\Delta P4$ can be determined in the similar manner; and L1, L2, L3, L4 each are distances between corresponding two adjacent pressure detecting members, in m. For example, L1 is the distance between the first pressure detecting member 610 and the second pressure detecting member 620, and L2, L3 and L4 are determined in the similar manner.

The system 1 for testing the rheological behavior of slurry according to embodiments of the present disclosure has the following advantages.

1. Adjustable compressed air is used as an external driving source, and slurry of different properties in the closed stirring reactors may flow in the pipeline at different rates.

2. In the test process, the stirring reactors and the transporting pipeline 30 constitute a closed system, the compressed air supplied by the gasholder 420 makes the slurry have a certain initial potential energy, and the slurry can be stably transported in the transporting pipeline 30 under the action of the compressed air.

3. The pressure detecting members 60 are set along the transporting pipeline 30, and are capable of automatically collecting the pressure data and transmitting the pressure data to the controlling system. Pressures and pressure differences at individual testing points can be automatically monitored and calculated.

4. Two stirring reactors are used in the system. In the test process, functions of the first stirring reactor 10 and the second stirring reactor 20 may be switched therebetween, thereby improving the test efficiency.

The system 1 for testing the rheological behavior of slurry according to embodiments of the present disclosure can simulate gravity delivery of the slurry under high pressure environment, and determine the rheological behavior of the slurry by using pipeline transportation parameters. The data obtained by this method is accurate, reliable, and closest to the production practice. The system has strong adaptability and high practical value. Flow status analysis of the slurry is the basis for relevant researches, which has been widely used in various industries, especially in the field of mining. Therefore, the present disclosure has a great market promotion value.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although embodiments have been shown and described, it would be appreciated by those skilled in the art that changes, alternatives, replacements and modifications can be made in the embodiments without departing from spirit and principles of the present disclosure, and the scope of the present disclosure is defined by appended claims and equivalents thereof.

What is claimed is:

1. A system for testing a rheological behavior of slurry, comprising:
    a first stirring reactor, provided with a first opening;
    a second stirring reactor, provided with a second opening;
    a transporting pipeline, connecting the first opening and the second opening;
    a driving device, connected to each of the first stirring reactor and the second stirring reactor, configured to drive a first state that the slurry in the first stirring reactor is output to the second stirring reactor, and drive a second state that the slurry in the second stirring reactor is output to the first stirring reactor, and at least configured to be capable of switching between the first state and the second state; and
    a pressure detecting member, configured to measure pressure in the transporting pipeline.

2. The system according to claim 1, wherein the driving device comprises: an air compressor, connected to each of the first stirring reactor and the second stirring reactor, and configured to drive flow of the slurry by adjusting air pressure.

3. The system according to claim 2, wherein the driving device further comprises: a gasholder arranged between the first stirring reactor and the air compressor and between the second stirring reactor and the air compressor.

4. The system according to claim 2, wherein a first regulating valve is provided between the air compressor and the first stirring reactor for adjusting air flow; and
    a second regulating valve is provided between the air compressor and the second stirring reactor for adjusting air flow.

5. The system according to claim 1, wherein the system comprises a plurality of the pressure detecting members spaced apart along a length direction of the transporting pipeline.

6. The system according to claim 1, further comprising:
    a controlling device, electrically connected to each of the first stirring reactor and the second stirring reactor to adjust a stirring speed of the first stirring reactor and that of the second stirring reactor, respectively; electrically connected to the driving device to adjust a running state of the driving device; and electrically connected to the pressure detecting member to record data collected by the pressure detecting member.

7. The system according to claim 1, further comprising: an atmospheric stirring tank, connected to the first stirring reactor to supply the slurry for the first stirring reactor.

8. The system according to claim 7, further comprising: a transporting valve disposed between the atmospheric stirring tank and the first stirring reactor.

9. The system according to claim 1, wherein the transporting pipeline is arranged to meander between the first stirring reactor and the second stirring reactor to prolong connection between the first stirring reactor and the second stirring reactor.

10. The system according to claim 1, wherein the transporting pipeline is provided with the pressure detecting members at positions near the first opening, the second opening, and a bend of the transporting pipeline.

* * * * *